(12) United States Patent
Liu et al.

(10) Patent No.: US 10,430,120 B2
(45) Date of Patent: Oct. 1, 2019

(54) DATA OBJECT MANAGEMENT METHOD AND DATA OBJECT MANAGEMENT SYSTEM

(71) Applicant: INDUSTRIAL TECHNOLOGY RESEARCH INSTITUTE, Hsinchu (TW)

(72) Inventors: Pin-Chuan Liu, Hsinchu (TW); Wei-Chih Ting, Taichung (TW); Yao-Chin Yang, Hsinchu (TW); Yun-Shuai Yu, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 264 days.

(21) Appl. No.: 14/581,587

(22) Filed: Dec. 23, 2014

(65) Prior Publication Data

US 2016/0034385 A1 Feb. 4, 2016

Related U.S. Application Data

(60) Provisional application No. 62/030,856, filed on Jul. 30, 2014.

(51) Int. Cl.
*G06F 13/18* (2006.01)
*G06F 3/06* (2006.01)
*H04N 5/76* (2006.01)

(52) U.S. Cl.
CPC ............ *G06F 3/067* (2013.01); *G06F 3/0604* (2013.01); *G06F 3/064* (2013.01); *G06F 3/0613* (2013.01); *G06F 3/0631* (2013.01); *H04N 5/76* (2013.01); *G06F 13/18* (2013.01)

(58) Field of Classification Search
None
See application file for complete search history.

(56) References Cited

U.S. PATENT DOCUMENTS

| 7,640,299 | B2 | 12/2009 | Kaler et al. |
| 8,769,201 | B2 | 7/2014 | Hasenplaugh et al. |
| 2005/0232210 | A1 | 10/2005 | Karaoguz et al. |
| 2012/0246205 | A1* | 9/2012 | Taguchi ............ G06F 17/30159 707/822 |

(Continued)

FOREIGN PATENT DOCUMENTS

| CN | 102081549 A | 6/2011 |
| CN | 202652419 U | 1/2013 |

(Continued)

OTHER PUBLICATIONS

Intellectual Property Office, Ministry of Economic Affairs, R. O. C, "Office Action", dated Nov. 23, 2015, Taiwan.

(Continued)

*Primary Examiner* — Brian R Peugh
(74) *Attorney, Agent, or Firm* — Locke Lord LLP; Tim Tingkang Xia, Esq.

(57) ABSTRACT

A data object management method and a data object management system are provided. The data object management method includes the following steps. Generate a space allocation list according to an operation parameter of a space consuming device. The space allocation list records information about a plurality of storage spaces. Update the space allocation list and a target storage space. The target storage space is one of the storage spaces. Send a playlist corresponding to the space allocation list when a reading request corresponding to the space consuming device is received.

20 Claims, 4 Drawing Sheets

(56) References Cited

U.S. PATENT DOCUMENTS

| | | |
|---|---|---|
| 2013/0041808 A1 | 2/2013 | Pham et al. |
| 2013/0242107 A1 | 9/2013 | Huang |
| 2013/0311597 A1* | 11/2013 | Arrouye ............... G06F 9/5072 709/217 |

FOREIGN PATENT DOCUMENTS

| | | |
|---|---|---|
| CN | 102946440 A | 2/2013 |
| CN | 202772924 U | 3/2013 |
| CN | 103152437 A | 6/2013 |
| CN | 202979116 U | 6/2013 |
| TW | 200929941 A | 7/2009 |
| TW | 201220767 A | 5/2012 |
| TW | 201411368 A | 3/2014 |

OTHER PUBLICATIONS

D. A. Rodriguez-Silva et al., Video surveillance based on cloud storage, IEEE Fifth International Conference on Cloud Computing, Computer Society, 2012, 991-992.

Lingshan Xu et al., A Cloud-based monitoring framework for Smart Home, IEEE 4th International Conference on Cloud Computing Technology and Science, Computer Society, 2012, 805-810.

Ru Xue et al., Application of Cloud Storage in Traffic Video Detection, IEEE Seventh International Conference on Computational Intelligence and Security, Computer Society, 2011, 1294-1297.

Swarnava Dey et al., Smart City Surveillance : Leveraging Benefits of Cloud Data Stores, First IEEE International Workshop on GlObal Trends in Smart Cities, 2012, 868-876.

Chia-Feng Lin et al., A framework for scalable cloud video recorder system in surveillance environment, IEEE 9th International Conference on Ubiquitous Intelligence and Computing and 9th International Conference on Autonomic and Trusted Computing, Computer Society, 2012, 655-660.

Prahlada Rao B. B et al., Cloud Computing for Internet of Things & Sensing Based Applications, IEEE Sixth International Conference on Sensing Technology (ICST), 2012, 374-380.

Chinese Office Action dated Nov. 6, 2017 in application No. 201510118986.7.

* cited by examiner

DATA OBJECT MANAGEMENT METHOD AND DATA OBJECT MANAGEMENT SYSTEM

CROSS-REFERENCE TO RELATED APPLICATIONS

This non-provisional application claims priority under 35 U.S.C. § 119(a) on Patent Application No(s). 62/030,856 filed in United States on Jul. 30, 2014, the entire contents of which are hereby incorporated by reference.

TECHNICAL FIELD

The disclosure relates to a data object management method and a data object management system.

BACKGROUND

With the rapid development of technology, the number of electronic devices on the Internet around the world grows apace. The size of video sensors becomes smaller day by day, which drives wide adoption of multimedia technologies. Therefore, a great deal of multimedia data has been and will be transmitted over the Internet.

For example, in 2013 Internet Trends, Mary Meeker reported that Dropcam users uploaded more video to the Web every minute than YouTube users. Now, more than 100 hours of video per minute is uploaded to YouTube.

However, such a large throughput of multimedia data has seriously affected the network performance, especially the throughput of conventional data streams. The throughput of conventional data streams brings a very heavy load to the memory, CPU, I/O access of a media server.

SUMMARY

According to one or more embodiments, the disclosure provides a data object management method applied to a data object management system. In one embodiment, the data object management method includes the following steps. Receive an operation parameter from a space consuming device to produce a space allocation list recording information about a plurality of storage spaces. Update the space allocation list according to the operation parameter. When a read request corresponding to the space consuming device is received, a playlist corresponding to the space allocation list is sent.

According to one or more embodiments, the disclosure provides a data object management system. In one embodiment, the data object management system includes a space allocation module. The space allocation module receives an operation parameter from a space consuming device to produce a space allocation list recording information about a plurality of storage spaces, and updates the space allocation list according to the operation parameter.

According to one or more embodiments, the disclosure provides a data object management method applied to a space consuming device. In one embodiment, the data object management method includes the following steps. Receive a space allocation list from a data object management system. The space allocation list records information about a plurality of storage spaces. Search for the storage space with a first priority of a weight order of the storage spaces in the space allocation list. Set the storage space with the first priority of the weight order to be a target storage space. Write a data object to the target storage space. Update the space allocation list and the target storage space according to a schedule parameter.

BRIEF DESCRIPTION OF THE DRAWINGS

The present disclosure will become more fully understood from the detailed description given herein below for illustration only and, thus, does not limit the present disclosure, wherein.

DETAILED DESCRIPTION

Figure 1A:
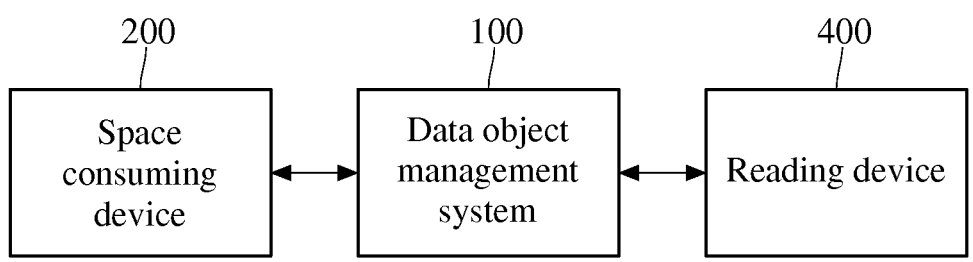
FIG. 1A is a schematic diagram of the operation of a data object management system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1A is a schematic diagram of the operation of a data object management system 100 according to an embodiment of the disclosure. The data object management system 100 communicates with a space consuming device 200 and a reading device 400.

When the space consuming device 200 sends out a request to write or read a data object, the data object management system 100 correspondingly allocates a plurality of storage spaces to the space consuming device 200 such that the space consuming device 200 can try writing one or more data objects to one or more than one of these storage spaces until successful writing. Since the space consuming device 200 writes one or more data objects to these storage spaces according to a specific order of these storage spaces, the space consuming device 200 may have more efficient performance in this writing task.

When the reading device 400 attempts to read out one data object that is written to the storage space by the space consuming device 200, the reading device 400 can respectively searches for the data object in these storage spaces according to the specific order of the storage spaces. In this way, the reading device 400 may have more efficient performance in this reading task.

On the other hand, the data object management system 100 can regularly or irregularly maintain these storage spaces, whereby the space consuming device 200 and the reading device 400 can maintain, enhance or suitably adjust the performance of accessing one or more data objects.

In view of the above description, the data object management system 100 focuses on the process of metadata of the data object rather than the disposition of a streaming server, thereby overcoming the upper limit on the number of service sources for a conventional streaming server. The data object can any type of data, any type file or any data block.

The following one or more exemplary embodiments will illustrate the data object management through the file management.

Figure 1B:
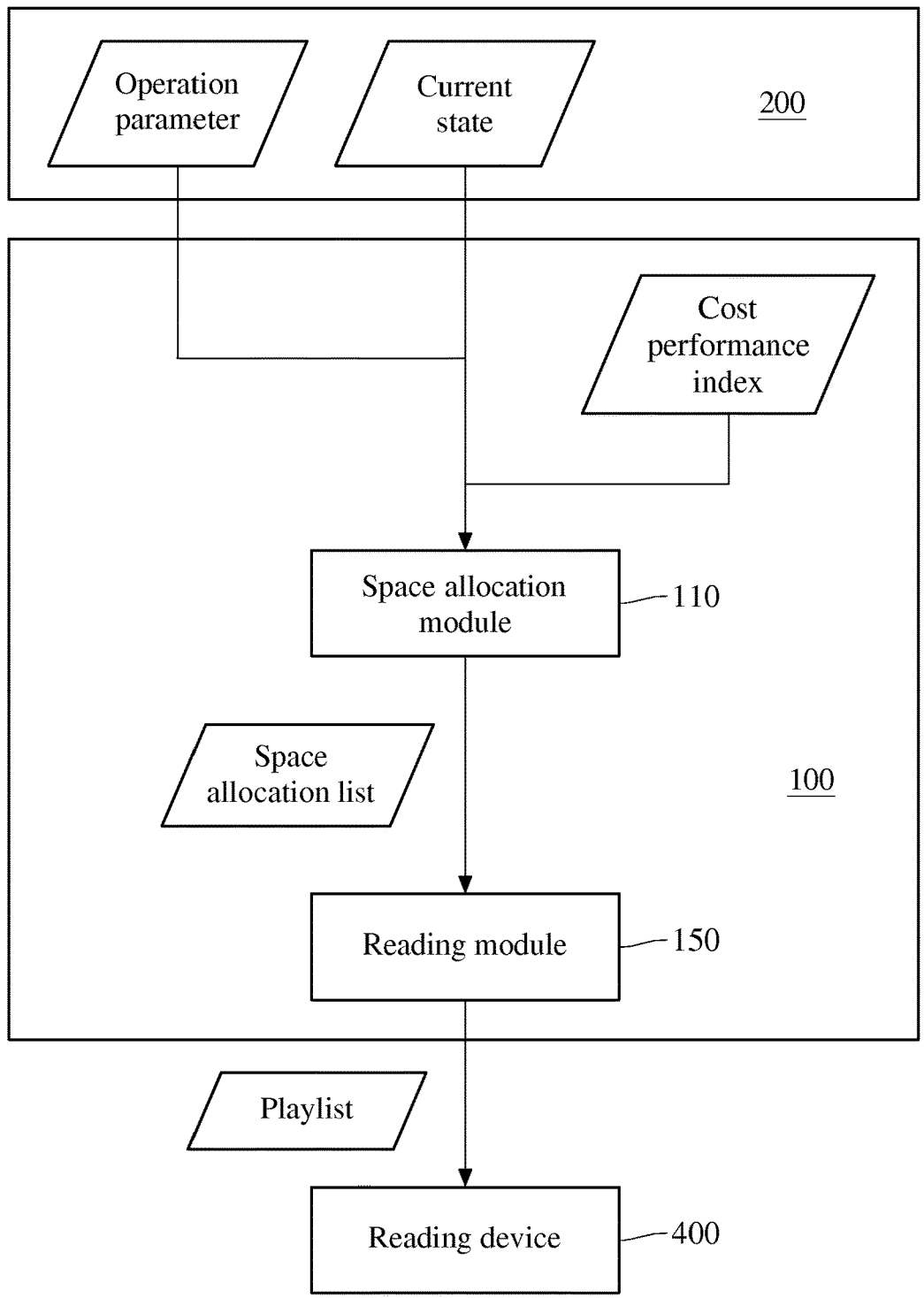
FIG. 1B is a schematic diagram of the operation of a data object management system according to other one embodiment of the disclosure.
Figure 1C:
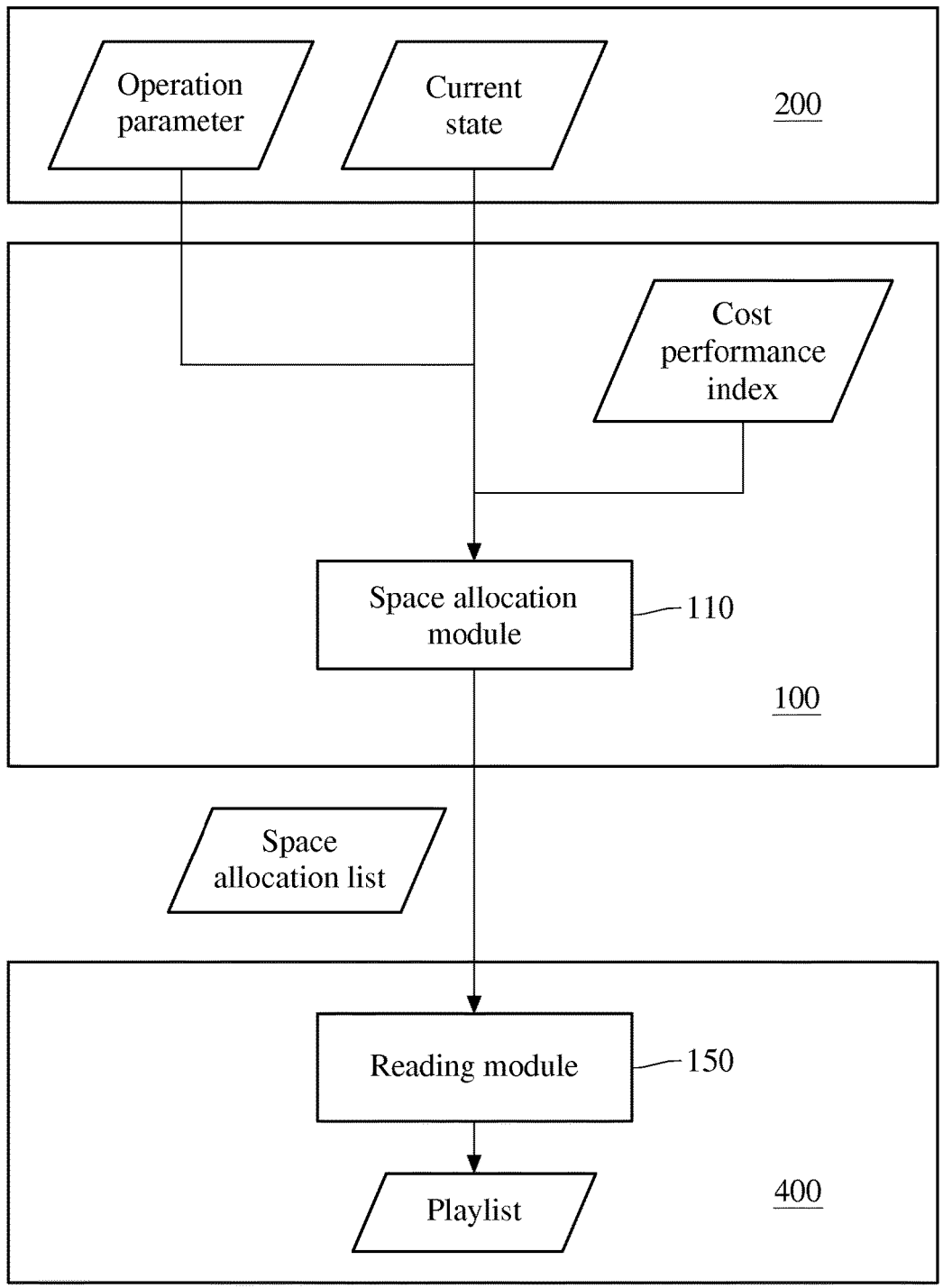
FIG. 1C is a schematic diagram of the operation of a data object management system according to other one embodiment of the disclosure.

FIG. 1B and FIG. 1C are schematic diagrams of the operation of a data object management system 100 according to different embodiments of the disclosure. In FIG. 1B, the data object management system 100 includes a space allocation module 110 and a reading module 150, and the reading module 150 is outside a reading device 400. Compared with the data object management system 100 in FIG. 1B, the reading module 150 of the data object management system 100 in FIG. 1C is in the reading device 400. For example, the space allocation module 110 and the reading module 150 can be a server system including a number of servers, be a software module executed in a single server, or be a microprocessor or any suitable chip, but the disclosure will not be limited thereto.

In the embodiment, the data object management system 100 can be a server corresponding to a space consuming device 200 and a space providing device 300. The space providing device 300 provides storage spaces and can be any possible network attached storage (NAS) such as a simple storage service (S3) of a storage area network (SAN) (e.g. the Amazon web service (AWS)), a simple storage service of the HiCloud, a wireless portable hard disk drive (e.g. a Wi-Fi portable hard disk drive), or a wireless memory card (e.g. a Wi-Fi memory card), but the disclosure will not be limited thereto. For example, the space consuming device 200 can be an IP camera or any possible electronic device capable of writing (e.g. adding, deleting, or updating) data objects to one or more storage spaces provided by the space providing device 300. The file provided by the space consuming device 200 can be a binary large object (BLOB), e.g. a digital video file or other type files, but the disclosure will not be limited thereto.

In following one or more embodiments, the space consuming device 200 is an IP camera installed in a house to monitor how a babysitter takes care of a baby, but the disclosure will not be limited thereto.

After the space consuming device 200 is started up and before a digital video is captured, the space allocation module 110 receives an operation parameter from the space consuming device 200 to produce a space allocation list. For example, the operation parameter includes the file format (e.g. the format of a digital video file) adapted to the space consuming device 200, the location of the space consuming device 200 (e.g. an IP address or a geographic location), the model of the space consuming device 200, and/or a networking state of the space consuming device 200, but the disclosure will not be limited thereto. The space allocation list records information about the above storage spaces that can include, for example, one or more storage spaces more suitable to the file format supported by the space allocation module 110, one or more storage spaces close to the space consuming device 200, and/or one or more storage spaces having better network performance. In other words, the space allocation module 110 provides a more efficient list of storage space to video files captured by the space consuming device 200.

The storage spaces in the space allocation list have a weight order. In an embodiment, and the space allocation module 110 can define the weight order according to the entire conditions or available resources. In another embodiment, the space allocation module 110 can define the weight order of the storage spaces in the space allocation list according to the operation parameter of the space consuming device 200 or the cost performance index of each storage space. For example, when IP cameras are relocated to different countries, the space allocation module 110 will reallocate the storage spaces according to various geographic locations and network communication conditions. Alternately, when the cost performance index of at least one storage space changes (e.g. Amazon Web Service often changes the price of their cloud service), the space allocation module 110 can adjust the weight order of storage spaces according to their cost performance index. The cost performance index is a composite index associated with the cost and performance of a storage space. For example, a cheaper storage space or a storage space with higher performance has a higher cost performance index, but the disclosure will not be limited thereto.

Accordingly, before the space consuming device 200 captures a digital video, the space consuming device 200 can obtain a space allocation list from the data object management system 100, find out the storage space according to the weight order of storage spaces in the space allocation list, and set this storage space as a target storage space. Then, the space consuming device 200 tries to write a data object to the target storage space because the target storage space has a higher cost performance index in the space allocation list.

In one embodiment, the cost performance index of the storage space with a first priority of the weight order is maximum.

Moreover, during such a writing task, the space consuming device 200 determines whether writing the data object to the target storage space fails. When writing the data object to the target storage space fails, the space consuming device 200 will set the storage space next to the target storage space to be a next target storage space according to the priority of the weight order, whereby the space allocation list is updated. The space consuming device 200 tries to write the data object to this new target storage space. If writing the data object to the new target storage space fails, the space consuming device 200 will repeat the above process until the writing task successes.

In addition, the reason of writing failure may be network congestion during a short period of time. Therefore, the space consuming device 200 can regularly update the space allocation list and reappoint the storage space with the first priority of the weight order to be a target storage space according to a schedule parameter. The schedule parameter can be a specific cycle, e.g. 3 minutes. Every 3 minutes, the space consuming device 200 checks once whether the storage space with a higher priority is restored and can be written to. It can be sure in this way that the data object can be written to the storage space with a higher priority of the weight order again, thereby achieving long-term good storage efficiency.

In an embodiment, when failing to write a data object to the current target storage space, the space consuming device 200 can further record a current state of writing failure. When writing failure occurs, the number of storage spaces recorded in the space allocation list has to increase to provide the space consuming device 200 with better uploading quality.

Therefore, the space allocation module 110, according to a current state of the space consuming device 200, determines whether the space consuming device 200 has ever failed to write one or more data objects to the one or more storage spaces related to such a current state. When the space consuming device 200 has ever failed to write one or more data objects to the one or more storage spaces, the space allocation module 110 may search for a new storage space not belonging to the original one or more storage spaces and record the information about this new storage space in the space allocation list for updating, and this new storage space has the first priority of the weight order in the updated space allocation list. For example, besides the one or more storage spaces in the space allocation list, the space allocation module 110 can add a new storage space and set it as the storage space with the first priority of the weight order. In one embodiment, the new storage space has a cost performance index greater than that of the storage space with the first priority of the weight order.

In an embodiment, the space allocation module 110 can update the space allocation list and replace the target storage space by a substitute according to the current state of the space consuming device 200. For example, if the current state of the space consuming device 200 indicates that writing failure has ever been happened, the space allocation module 110 may decide to newly add another storage space and produce a new space allocation list recording information about storage spaces. After obtaining this new space allocation list, the space consuming device 200 can set this new storage space as the target storage space if the new storage space is the first priority of the weight order in the space allocation list.

In such a way, the space consuming device 200 can write a digital video to the storage space assigned by the space allocation module 110.

After the data object management system 100 arranges the storage space for the space consuming device 200, the data object management system 100 can operate in response to a read request. When receiving a read request from the reading device 400, the reading module 150 sends a playlist corresponding to a space allocation list of the space consuming device 200. In the embodiment of disposing the reading module 150 in the data object management system 100 as shown in FIG. 1B, the reading module 150 can send the playlist to the reading device 400 through a network. In the embodiment of disposing the reading module 150 in the reading device 400 as shown in FIG. 1C, the reading module 150 in the reading device 400 can produce the playlist after receiving the space allocation list from the space allocation module 110 through a network, and can provide the reading device 400 with the playlist, so that the reading device 400 can execute other function units of the playlist.

In practice, the reading module 150 produces a playlist in response to a read request after receiving the read request from the reading device 400, or actively provides the reading device 400 with a playlist (e.g. Apple Push notification or Google Cloud messaging). For example, the playlist includes one or more uniform resource locators (URLs). For example, the format of URL can be original file format (e.g. the format of the filename extension .ts) or a transformed format (e.g. the format of the filename extension .mp4, .mp3, .wav, .aac, or .zip).

In an exemplary embodiment, when a user intends to watch a digital video when wanting know how a babysitter took care of a user's infant at home, a mobile device can be employed to send the reading module 150 a read request corresponding to the digital video. The reading module 150 sends the mobile device a playlist in response to the read request such that the mobile device can, according to the playlist, know where the storage space storing the digital video is, download the digital video from this storage space, and play the downloaded digital video. In practice, after the reading module 150 receives the read request, the reading module 150 can check the storage spaces in the space allocation list one by one according to the weight order to determine whether the storage space to be checked has a file corresponding to the read request. Once the storage space having the file corresponding to the read request is found, the reading module 150 will produce a playlist corresponding to the storage space and send the playlist to the mobile device. In this way, the mobile device can play the digital video according to the playlist.

Therefore, the data object management system 100 can provide spaces that the space consuming device 200 can write one or more data objects to, and provide sources for the reading device 400 to read from. Moreover, since the space to be written to and the source to be read from are probably the storage space having a higher priority of the weight order in the space allocation list, the process of searching the desired storage space may be speeded up.

The space consuming device 200 and the reading device 400 can be virtual devices embodied by the save device, e.g. a mobile phone functioning as a video source capable of capturing videos. In other words, the mobile phone can function as a space consuming device as well as a reading device capable of playing videos.

Figure 2:
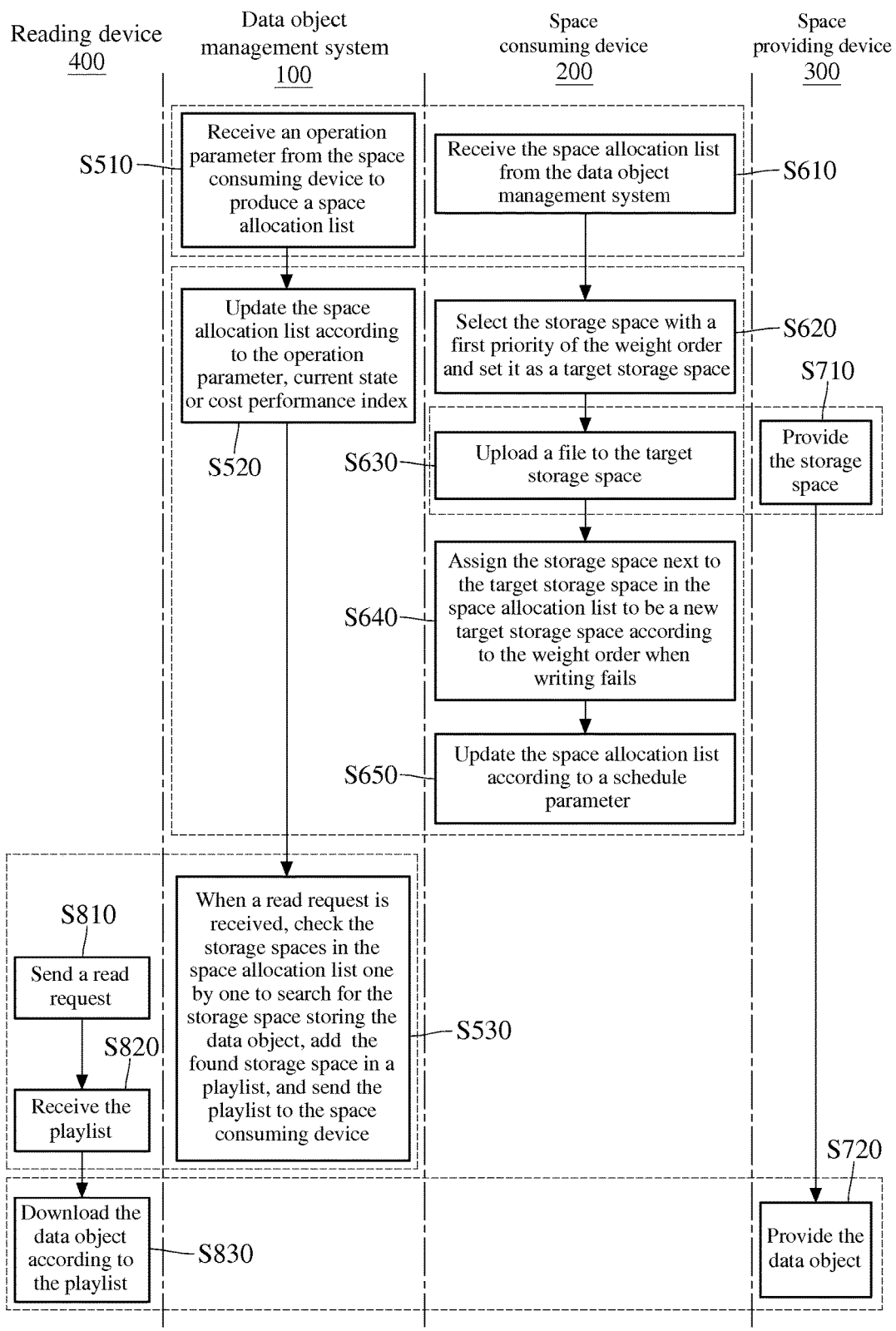
FIG. 2 is a flow chart of a data object management method according to an embodiment of the disclosure.

FIG. 2 is a flow chart of a data object management method respectively performed by the data object management system 100, the space consuming device 200, the space providing device 300 (i.e. the target storage space), and the reading device 400 according to an embodiment of the disclosure. The data object management method in FIG. 2 includes steps S510 to S530, S610 to S650, S710 to S720, and S810 to S830. The steps in the same dashed-line block are performed at the same stage and related to each other.

In step S510, the space allocation module 110 receives an operation parameter from the space consuming device 200 to produce a space allocation list. The space allocation list records information about storage spaces. In step S520, the space allocation module 110 updates the space allocation list according to the operation parameter of the space consuming device, a current state, or a cost performance index of storage space. In step S530, when the reading module 150 receives a read request corresponding to the space consuming device 200, the reading module 150 sends a playlist corresponding to the space allocation list.

In step S610, the space consuming device 200 receives the space allocation list from the data object management system 100. In step S620, the space consuming device 200 selects the storage space with the first priority of the weight order in the space allocation list according to the weight order and set this storage space as a target storage space. In step S630, the space consuming device 200 uploads (or writes) a file to the target storage space.

In step S640, when failing to write the file to the target storage space, the space consuming device 200 assigns the storage space next to the target storage space in the space allocation list to be a new target storage space according to the weight order. In step S650, the space allocation module 110 updates the space allocation list according to a schedule parameter. In step S710, the space providing device 300 provides the storage space. In step S720, the space providing device 300 provides a file corresponding to a playlist. In step S810, the reading device 400 sends a read request. In step S820, the reading device 400 receives the playlist. In step S830, the reading device 400 downloads the file according to the playlist. The details of the above steps can be referred to the above embodiments and will not be repeated hereinafter.

According to one or more than one of the above embodiments, the data object management system 100 includes the space allocation module 110 and the reading module 150. The space allocation module 110 receives an operation parameter from a space consuming device to produce a space allocation list reciting information about storage spaces in the space providing device 300. The space allocation module 110 also defines the weight order of storage spaces according to, for example, the cost performance index of each storage space. In this way, the space consuming device 200 respectively sets each of the storage spaces in the space allocation list to be a target storage space according to the weight order and tries writing a data object to the target storage space until writing the data object successes. On the other hand, the space allocation module 110 can update the space allocation list according to the operation parameter or current state of the space consuming device or the cost performance index of the storage space. For example, if the current state of the space consuming device 200 indicates that writing failure occurs many times, the space allocation module 110 can add a new storage space to the space allocation list and assign it for the first priority. The space consuming device 200 regularly appoints the storage space with the first priority of the weight order to be the target storage space according to a schedule parameter. When the data object management system 100 receives a read request corresponding to files in the space consuming device 200 from the reading device 400, the reading module 150 can respectively check each storage space in the space allocation list according to the weight order of the storage spaces until the storage space corresponding to the read request is found. After this storage space is found, the reading module 150 produces and sends a playlist corresponding to this storage space to the reading device 400. In this way, the data object management system 100 can provide the space consuming device 200 with a storage target to be written to, and provide the reading device 400 with a source to be read from. Since the storage spaces in the space allocation list are sorted according to the weight order, the process of writing or reading data may be speeded up. Therefore, the disclosure might prevent system being overloaded caused by a great deal of space consuming device 200 or reading device 400.

What is claimed is:

1. A data object management method applied to a data object management system, comprising:
before a data object is requested to be stored, receiving an operation parameter from a space consuming device to produce a space allocation list with a weight order of a plurality of storage spaces, wherein before the data object is requested to be stored, the space consuming device searches for one of the plurality of storage spaces with a first priority of the weight order in the space allocation list and sets said one of the plurality of storage spaces as a target storage space, the space consuming device executes writing the data object to the target storage space, and determines whether writing the data object to the target storage space fails, and when writing the data object to the target storage space fails, the space consuming device assigns another one of the plurality of storage spaces with a priority next to the first priority to be the target storage space according to the weight order;
updating the weight order in the space allocation list according to the operation parameter; and
when a read request corresponding to the space consuming device is received, checking the plurality of storage spaces one by one according to the weight order until one of the plurality of storage spaces, which has a file corresponding to the read request, is found, and generating a playlist corresponding to the storage space having the file, and sending the playlist;
wherein the operation parameter is one or more of an IP address, a geographic location and a networking state of the space consuming device.

2. The data object management method according to claim 1, wherein the step of receiving the operation parameter from the space consuming device to produce the space allocation list comprises:
determining a weight order of the storage spaces in the space allocation list.

3. The data object management method according to claim 2, wherein the step of determining the weight order of the storage spaces comprises:
determining the weight order of the storage spaces according to a cost performance index of each of the storage spaces,
wherein the cost performance index of the storage space with a first priority of the weight order is maximum.

4. The data object management method according to claim 3, wherein the step of updating the space allocation list according to the operation parameter comprises:
updating the space allocation list according to a current state of the space consuming device.

5. The data object management method according to claim 4, wherein the step of updating the space allocation list according to the current state of the space consuming device comprises:
determining whether the space consuming device fails to write a data object to one of the storage spaces of the space allocation list, according to the current state of the space consuming device;
when the space consuming device fails to write the data object to the storage space, searching for a new storage space that does not belong to the storage spaces and has the cost performance index greater than that of the storage space with the first priority of the weight order; and
adding the new storage space in the space allocation list to produce a new space allocation list in which the new storage space has the first priority of the weight order.

6. The data object management method according to claim 2, wherein the step of generating a playlist according to the weight order in the space allocation list and sending the playlist comprises:
searching for one of the storage spaces corresponding to a data object of the read request in the space allocation list according to the weight order, and
when the storage space corresponding to the data object of the read request is found, sending the playlist corresponding to the storage space corresponding to the data object of the read request.

7. The data object management method according to claim 1, wherein the space consuming device is one of a plurality of various consuming devices, and the operation parameter comprises information about said one of the plurality of various consuming devices and the space allocation list is produced according to said information.

8. A data object management system comprising:
a space allocation module for receiving an operation parameter from a space consuming device to produce a space allocation list with a weight order of a plurality of storage spaces before a data object is requested to be stored, and updating the weight order in the space allocation list according to the operation parameter; and
a reading module for checking the plurality of storage spaces one by one according to the weight order until one of the plurality of storage spaces, which has a file corresponding to a read request, is found, and generating a playlist corresponding to the storage space having the file, and sending the playlist when the reading module receives the read request corresponding to the space consuming device;

wherein the weight order is for the space consuming device to search for one of the plurality of storage spaces with a first priority of the weight order and to set said one of the plurality of storage spaces as a target storage space before the data object is requested to be stored, and to execute writing the data object to the target storage space, and is also for the space consuming device to assign another one of the plurality of storage spaces with a priority next to the first priority to be the target storage space when writing the data object to the target storage space fails;

wherein the operation parameter is one or more of an IP address, a geographic location and a networking state of the space consuming device.

9. The data object management system according to claim 8, wherein the space allocation module further defines a weight order of the storage spaces in the space allocation list.

10. The data object management system according to claim 9, wherein the space allocation module determines the weight order of the storage spaces according to a cost performance index of each of the storage spaces, and the cost performance index of the storage space with a first priority of the weight order is maximum.

11. The data object management system according to claim 10, wherein the space allocation module further updates the space allocation list according to a current state of the space consuming device.

12. The data object management system according to claim 11, wherein the space allocation module further, according to the current state of the space consuming device, determines whether one of the storage spaces fails to be written to; when the one of the storage spaces fails to be written to, the space allocation module searches for a new storage space not belonging to the storage spaces and adds the new storage space in the space allocation list to update the space allocation list, the new storage space has the cost performance index greater than the cost performance index of the storage space with the first priority in the space allocation list and has the first priority of the weight order in the updated space allocation list.

13. The data object management system according to claim 12, wherein the reading module further searches for the storage space corresponding to a data object of the read request in the space allocation list according to the weight order of the space allocation list, and when the storage space corresponding to the data object of the read request is found, the reading module sends the playlist corresponding to the storage space corresponding to the data object of the read request.

14. The data object management system according to claim 8, wherein the space consuming device is one of a plurality of various consuming devices.

15. The data object management system according to claim 8, wherein the operation parameter comprises information about the space consuming device, with said information comprising one or more of an adapted file format and the model of the space consuming device, and the space allocation list is produced according to said information.

16. A data object management method applied to a space consuming device and comprising:
receiving a space allocation list from a data object management system, with the space allocation list with a weight order of a plurality of storage spaces, wherein the space allocation list is produced before a data object is requested to be stored;
before the data object is requested to be stored, searching for a storage space with a first priority of the weight order in the space allocation list and setting the storage space with the first priority of the weight order to be a target storage space;
writing the data object to the target storage space; and
updating the weight order in the space allocation list and the target storage space according to a schedule parameter;
wherein the step of writing a data object to the target storage space comprises:
determining whether writing the data object to the target storage space fails; and
when writing the data object to the target storage space fails, assigning another one of the plurality of storage spaces with a priority next to the first priority to be the target storage space according to the weight order in the space allocation list;
wherein when a read request corresponding to the space consuming device is received by a reading module, the reading module checks the plurality of storage spaces one by one according to the weight order until one of the plurality of storage spaces, which has a file corresponding to the read request, is found, and generates a playlist corresponding to the storage space having the file, and sends the playlist when the reading module receives the read request corresponding to the space consuming device;
wherein the operation parameter is one or more of an IP address, a geographic location and a networking state of the space consuming device, and the schedule parameter is a specific cycle.

17. The data object management method according to claim 16, wherein the step of writing the data object to the target storage space comprises:
determining whether writing the data object to the target storage space fails; and
when writing the data object to the target storage space fails, setting the storage space next to the target storage space in the space allocation list to be a next target storage space according to the weight order.

18. The data object management method according to claim 17, wherein the step of setting the storage space next to the target storage space in the space allocation list to be the next target storage space according to the weight order of the space allocation list comprises:
when writing the data object to the target storage space fails, recording a current state of writing failure.

19. The data object management method according to claim 16, wherein the step of updating the space allocation list and the target storage space according to the schedule parameter comprises:
reappointing the storage space with the first priority of the weight order to be the target storage space according to the schedule parameter.

20. The data object management method according to claim 16, wherein the space consuming device is one of a plurality of various consuming devices.

* * * * *